June 7, 1938.   J. J. COOPER   2,120,019
PISTON
Filed Nov. 27, 1935
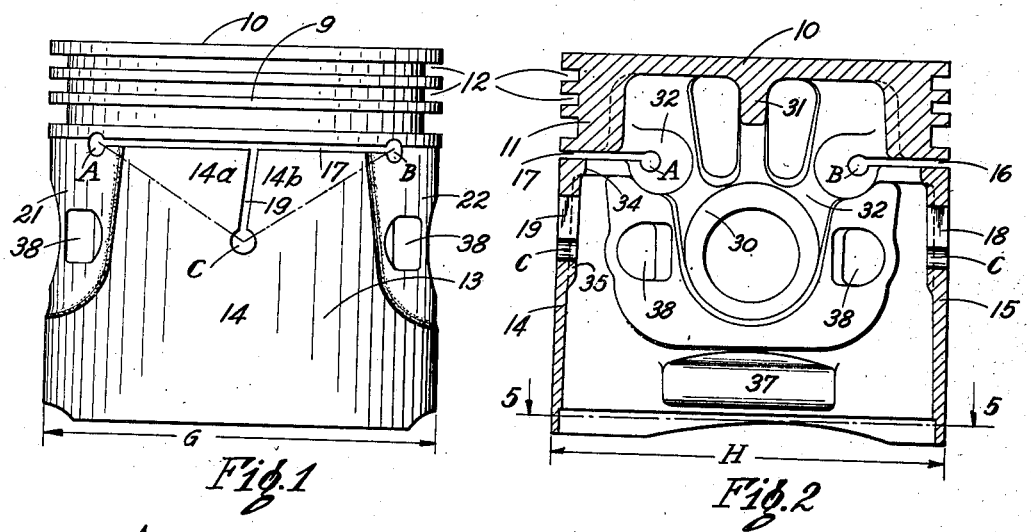
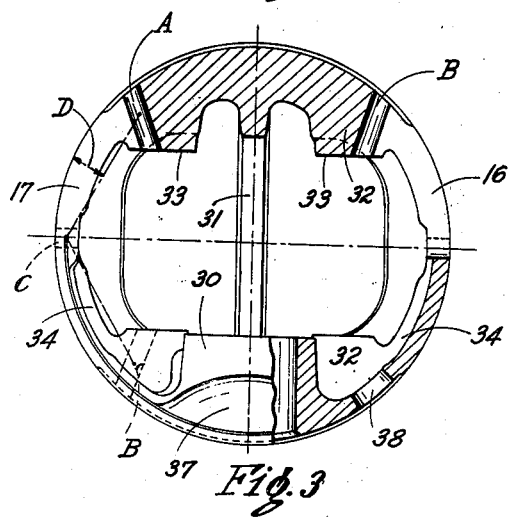
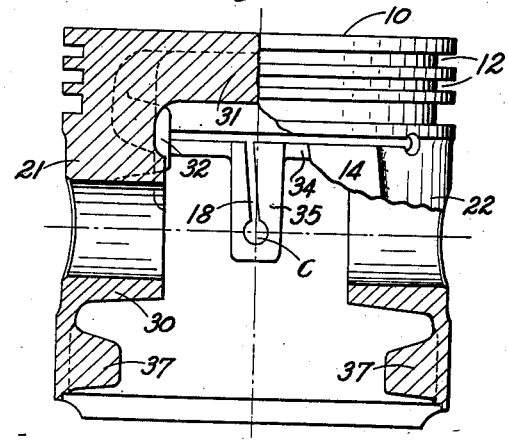
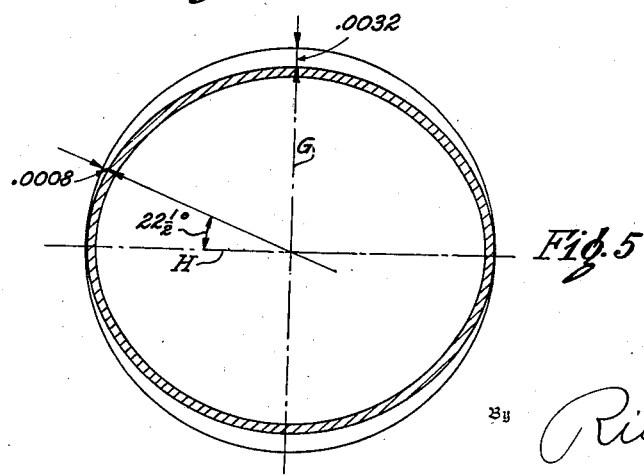
Inventor
JAMES J. COOPER
By Richey & Watts
Attorneys Patented June 7, 1938

2,120,019

UNITED STATES PATENT OFFICE 2,120,019

PISTON

James J. Cooper, Detroit, Mich., assignor, by mesne assignments, to The Cleveland Trust Company, Cleveland, Ohio, a corporation of Ohio, as trustee Application November 27, 1935, Serial No. 51,854

1 Claim. (Cl. 309—11)

This invention relates to pistons for internal combustion engines or the like, and more particularly pistons made of light metal having a relatively high coefficient of expansion such as aluminum or aluminum alloy to be used in a cylinder made of a material having a relatively low coefficient of expansion, such as cast iron.

It is well known that such pistons possess many desirable qualities such as lightness, high heat conductivity, good bearing characteristics and the like, but since the coefficient of expansion due to heat of such materials differs from that of the cylinders in which they operate, difficulties and disadvantages are encountered at various temperatures. For example, pistons having a close initial fit so that they will not slap when cold have a tendency to stick when hot and vice versa.

The principal object of my invention is to provide a piston made of aluminum, aluminum alloy or the like which can be fitted with a very small diametrical clearance across the thrust faces when installed and which clearance will be substantially maintained throughout the temperature ranges when in operation without slapping, binding, or scoring of the cylinders or undue wear on the piston itself.

A further object of the invention is to provide a piston wherein the piston skirt is shaped and slotted in a manner to utilize the thermal expansion in the piston head whereby the diameter of the skirt tends to be decreased at the top of the thrust faces during operation and said diameter decreasing tendency is progressively lessened toward the bottom of the skirt. A further object of the invention is to provide a piston according to the preceding object in which the diameter differentials at the upper and lower portions of the thrust faces permit the lower portion to assume a part of the increasing bearing pressures attending high speed operation and function as an oil scraper.

These and other objects relating to the strength and long life and economies of manufacture will be better understood from the description and the drawing forming a part of the specification wherein:

Figure 1 is an elevation taken on the thrust face side of a piston embodying my invention;

Figure 2 is a transverse sectional view taken on a diameter across the thrust faces of the piston;

Figure 3 is a partial sectional view looking from the under side of the piston;

Figure 4 is a side elevation with parts in section taken along the wrist pin axis of the piston;

Figure 5 is a sectional view taken on line 5—5 of Figure 2.

Referring to the drawing the piston illustrated herein embodies a head 9 having a top wall 10 and a depending cylindrical ring flange 11 grooved as at 12 to receive piston rings. The piston skirt is shown generally at 13 and comprises opposed thrust or wearing faces 14 and 15 and opposed wrist pin boss faces 21 and 22. The thrust faces 14 and 15 are separated from the head 9 at their upper edges by horizontal slots 17 and 16 respectively. The slots 16 and 17 terminate in transverse apertures A and B formed in the pin boss faces 21 and 22 as best illustrated in Figure 3. The under side of the piston head is provided with an integrally formed rib 31 arranged parallel to the wrist pin axis and terminating in the upper side of the wrist pin boss 30. The interior of the piston above each of the wrist pin bosses is shaped to provide a pair of relatively massive diverging ribs 32 extending upwardly from the pin boss 30 and terminating in a plane 33 normal to the wrist pin axis. A third interior rib is provided at 34 which is disposed horizontally below each of the slots 16 and 17 and merges at the ends thereof adjacent the apertures A and B with the rib 32. Depending from the horizontal rib 34 and disposed to surround a substantially vertical slot 18 is a fourth internal rib 35. The slots 18 and 19 formed in the thrust faces 15 and 14 respectively intersect the horizontal slots 16 and 17 and terminate in apertures C in substantially the horizontal plane of the wrist pin axis.

Since the two slots (17—19 and 16—18) in each thrust face form a T-slot the portions of the thrust faces on each side of the vertical slot as at 14a and 14b are constrained to flex in response to thrust face pressure about a line between A and C or B and C. The lines AC and BC being disposed in chordal planes as best shown in Figure 3 the flexure about lines AC and BC is resisted by a curved portion of the piston wall. The portion 14a may, for example, be considered as a curved cantilever beam which has an effective depth to resist bending indicated by the dotted line D of Figure 3. This is a characteristic of pistons having this type of slotting and as disclosed and claimed in the patent to George L. Moore, No. 1,927,611, September 19, 1933.

Preferably the vertical slots 18—19 terminate at or above the axis of the wrist pin to effectively transmit the thrust to the wrist pin. It will be observed that the thrust between the wrist pin and the thrust faces will be centered at each side of the aperture C in the plane of the wrist pin axis. Since this point of thrust application is below the lines AC and BC, said thrust is ineffective to flex the triangular leaves 14a and 14b about said lines. The thrust will be transmitted perimetrically each way from the aperture C to the pin bosses and thus will not adversely affect the piston structure provided to compensate for thermal expansion.

The piston head portion including the ring flange 11 is finished to a diameter to insure ample clearance at any operating temperature and the skirt portion of the piston is preferably cam ground to the contour indicated by the cross-section shown in Figure 5. The pin boss faces 21 and 22 are preferably formed with a relief during the casting or machining operations and are cut away as at 38 to reduce the weight of the piston. Pads 37 may be formed on the interior of the piston during the casting operation to facilitate the balancing of the finished article. The wedge shape of the relief on the pin boss faces results in thrust faces narrow at the top and gradually widening toward the bottom to join each other and form a continuous band at the open end of the piston. This band maintains a sufficiently close fit with the cylinder wall during operation to serve as an oil wiper.

Although it is difficult to determine exactly all of the changes in contour and all of the elements of the operation of a piston constructed according to my invention when subjected to the heat and pressure attending engine operation I have found that a piston so constructed may be fitted in the cylinder while cold with smaller clearances than employed in prior art pistons and yet will not bind or seize when heated by operation of the engine. For instance the piston may be fitted in the cylinder with a minimum clearance across the maximum diameter (H) and a progressively increasing clearance each side thereof around to the diameter (G), the increasing clearance on each side of the diameter (H) being insufficient to permit the piston to move in the cylinder along the wrist pin axis (G). For example, in a piston constructed according to my invention having a diameter of 3.0905 inches across the thrust faces, a deviation from a circle of that diameter of .0008 at 22½° from the maximum diameter and a deviation of .0032 at the minimum diameter (G) effectively prevents any slapping and any movement of the piston along the wrist pin axis when cold, and brings about an even distribution of bearing pressures on the thrust faces and will not bind or seize when heated during operation.

As the piston is heated during operation of the engine I believe that the heat of combustion above the piston head is transmitted to the skirt through the ribs 31 and 32 and that portion of the skirt between the apertures A and B. The heat thus introduced at the pin boss face flows laterally and downwardly through the skirt portions which bear against the cylinder walls where the heat is dissipated in the water or other cylinder cooling medium. The expansion in the head occasioned by the rise in temperature is transmitted mechanically to the skirt through the pin boss faces integral with the head. The head expansion thus serves to move the pin boss faces away from each other and this action tends to move the upper part of the thrust faces inwardly toward each other. The resulting tendency for the thrust faces to move toward each other however, is compensated for by the expansion in the upper portion of the skirt and thus the clearance at the diameter H remains substantially unchanged whereas the clearance at the wrist pin diameter is decreased. At the upper portion of the skirt the reliefs 21—22 accommodate the movement along the wrist pin axis. Any expansion in the upper portion of the skirt which is not compensated for by the movement along the wrist pin axis may be absorbed in the vertical slots 18 and 19. Thus in the upper portion of the skirt the distortion resulting from head expansion and the vertical slot co-operate to accommodate the relatively higher temperatures characteristic of this part of the skirt.

Both of the expansion accommodating devices for the upper portion of the skirt co-operate according to my theory of operation to control the clearances at the lower part of the skirt. The lower portion responds to outward movement along the wrist pin boss axis to tend to reduce the diameter across H as described above. Since the temperature is lower in this area the movement is not as marked at the lower part of the skirt as above the pin bosses. Movement of the portions such as 14a and 14b toward each other to effect a closing of the vertical slot is transmitted mechanically to the lower portion of the skirt and tends to supplement the action of the movement along the wrist pin axis in that it tends to reduce the diameter across the thrust faces at the lower part of the piston. This may be readily understood when a diameter through the apertures C is considered as a neutral axis. When 14a and 14b move toward each other to close the slot above this axis the areas therebelow tend to be moved away from each other. As said last mentioned areas are urged away from each other a "flattening" action occurs at the curved piston part joining said areas and thus the diameter thereacross tends to be reduced.

From the foregoing it will be observed that the expansive forces in the piston effect a deformation throughout the skirt and that this deformation varies throughout the skirt so that the lower portion of the skirt "lags" behind the deformation in the upper part. Among the advantages flowing from this are, first, that the lower portion may assume the increasing bearing pressures attending higher speed and second, that the lower portion of the skirt may function as an oil wiper.

Although I have described one embodiment of my invention in considerable detail and have proposed but one theory of operation for the structure, those skilled in the piston art will appreciate that forces acting upon the piston during operation may vary the operation outlined considerably and that the piston structure itself may be modified without departing from the scope of the invention as claimed herein.

I claim:

An internal combustion engine piston, composed of a material having a co-efficient of thermal expansion higher than cast iron, comprising a head having a depending ring flange, wrist pin bosses depending from and rigidly connected to said ring flange, and a skirt oval in contour with its major axis perpendicular to the wrist pin axis integrally connected at its upper edge to said ring flange in the region of said bosses and separated at its upper edge from the ring flange on both sides of the bosses by two arcuate horizontal slots, each side of said skirt being provided with a substantially vertical slot intersecting the said horizontal slot substantially at the center thereof, and extending downwardly therefrom and terminating above the lower limit of said wrist pin bosses, leaving a circumferentially continuous cylinder bearing skirt portion beneath the lower ends of said vertical slots to transmit thrust loads to said pin bosses.

JAMES J. COOPER.